United States Patent
Decarreau et al.

(10) Patent No.: US 12,513,583 B2
(45) Date of Patent: Dec. 30, 2025

(54) METHOD, APPARATUS, COMPUTER PROGRAM PRODUCT AND COMPUTER PROGRAM

(71) Applicant: Nokia Technologies Oy, Espoo (FI)

(72) Inventors: Guillaume Decarreau, Munich (DE); Ingo Viering, Munich (DE)

(73) Assignee: Nokia Technologies Oy, Espoo (FI)

( * ) Notice: Subject to any disclaimer, the term of this patent is extended or adjusted under 35 U.S.C. 154(b) by 346 days.

(21) Appl. No.: 17/594,645

(22) PCT Filed: Apr. 30, 2019

(86) PCT No.: PCT/EP2019/061052
§ 371 (c)(1),
(2) Date: Oct. 25, 2021

(87) PCT Pub. No.: WO2020/221441
PCT Pub. Date: Nov. 5, 2020

(65) Prior Publication Data
US 2022/0201568 A1   Jun. 23, 2022

(51) Int. Cl.
*H04W 36/00* (2009.01)

(52) U.S. Cl.
CPC . *H04W 36/00837* (2018.08); *H04W 36/0061* (2013.01); *H04W 36/0064* (2023.05)

(58) Field of Classification Search
CPC ....... H04W 36/00837; H04W 36/0061; H04W 36/08; H04W 36/0055; H04W 36/0005
See application file for complete search history.

(56) References Cited

U.S. PATENT DOCUMENTS

| | | |
|---|---|---|
| 2018/0035337 A1 | 2/2018 | Kitazoe et al. |
| 2022/0015188 A1* | 1/2022 | Bao .............. H04W 72/1263 |
| 2022/0022121 A1* | 1/2022 | Eklöf ............. H04W 36/00837 |
| 2022/0053598 A1* | 2/2022 | Peng .............. H04W 36/00698 |
| 2022/0070741 A1* | 3/2022 | Eklöf ............. H04W 36/0077 |
| 2022/0191752 A1* | 6/2022 | Rune ................ H04W 36/245 |
| 2022/0191755 A1* | 6/2022 | Ohlsson ......... H04W 36/00835 |
| 2022/0201573 A1* | 6/2022 | Tsuboi ............ H04W 36/0044 |

FOREIGN PATENT DOCUMENTS

EP   2 983 407 A1   2/2016

OTHER PUBLICATIONS

3GPP TSG-RAN WG2 #97bis; R2-1704087; Source: Ericsson, Qualcomm ; Title: Conditional Handover; Hangzhou, China, May 15-19, 2017. (Year: 2017).*

(Continued)

*Primary Examiner* — Mohammed S Chowdhury
(74) *Attorney, Agent, or Firm* — McCarter & English LLP (57) ABSTRACT

A method includes receiving at an apparatus of a communications device, from a source base station, first configuration information for a conditional handover of the communications device from the source base station to the target base station and subsequently receiving at the apparatus, before the conditional handover has occurred, second configuration information for the conditional handover of the communications device from the source base station to the target base station.

8 Claims, 9 Drawing Sheets

(56) References Cited

OTHER PUBLICATIONS

3GPP TSG-RAN WG2 #101; R2-1803336; Source: Ericsson; Title: Conditional Handover; Athens, Greece, Feb. 26-Mar. 2, 2018 (Year: 2018).*
3GPP TSG RAN WG2 Meeting #103bis ; R2-1814051; Source: Intel Corporation; Title: Discussion of conditional handover; Chengdu, China, Oct. 8-12, 2018 (Year: 2019).*
3GPP TSG RAN WG2 Meeting #105bis; R2-1903443; Source: Intel Corporation; Title: Discussion of conditional handover ; Xi'an, China, Apr. 8-12, 2019 (Year: 2019).*
3GPP TSG-RAN WG2 meeting #58-bis, Orlando, Florida, USA, Jun. 25-29, 2007, R2-072786, Qualcomm, "Delivery of HO Command", 3 pgs.
3GPP TSG-RAN WG2 #101, Athens, Greece, Feb. 26-Mar. 2, 2018, R2-1803336, Ericsson, "Conditional Handover", 6 pgs.
3GPP TSG RAN WG2 Meeting #105bis, Xi'an, China, Apr. 8-12, 2019, R2-1904257, ZTE Corporation, Sanechips, "Discussion on the configuration of CHO candidates", 5 pgs.

* cited by examiner

B1 Receiving at an apparatus of a source base station from a target base station first configuration information and second configuration information for a conditional handover of a communications device from the source base station to the target base station, the communications device using one of the first configuration information and second configuration information to communicate with the target base station

↓

B2 Causing by the source base station one of the first and second configuration information to be provided to said communications device

Fig. 10

METHOD, APPARATUS, COMPUTER PROGRAM PRODUCT AND COMPUTER PROGRAM

CROSS REFERENCE TO RELATED APPLICATION

This patent application is a U.S. National Stage application of International Patent Application Number PCT/EP2019/061052 filed Apr. 30, 2019, which is hereby incorporated by reference in its entirety.

FIELD OF THE DISCLOSURE

The present disclosure relates to an apparatus, methods, and computer programs and in particular but not exclusively for apparatus, methods and computer programs to be used in a communications system.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communications devices.

Access to the communication system may be by means of an appropriate communications device or terminal. A communications device is provided with an appropriate signal receiving and transmitting apparatus for enabling communications, for example enabling access to a communication network or communications directly with other communications device. The communications device may access a carrier provided by a station or access point, and transmit and/or receive communications on the carrier.

The communication system and associated devices typically operate in accordance with a given standard or specification which sets out what the various entities associated with the system are permitted to do and how that should be achieved.

SUMMARY

According to an aspect, there is provided a method comprising: receiving at an apparatus of a communications device, from a source base station, first configuration information for a conditional handover of the communications device from the source base station to the target base station; and subsequently receiving at the apparatus, before the conditional handover has occurred, second configuration information for the conditional handover of the communications device from the source base station to the target base station.

The first configuration information may be shorter than said second configuration information.

The first configuration information may comprise information which causes a current configuration to be modified.

The second configuration information may comprise information which causes a new configuration to replace a current configuration.

The second configuration information may comprise information about parameters required by the communication device for said conditional handover.

The first configuration information may be provided in a conditional handover command message.

The second configuration message may be provided in a reconfiguration message.

The method may comprise determining that one or more conditions for the conditional handover have been met and in response using the configuration defined by the second configuration information.

The method maybe performed in an apparatus in a communications device.

According to another aspect, there is provided a method comprising: receiving at an apparatus of a source base station from a target base station first configuration information and second configuration information for a conditional handover of a communications device from the source base station to the target base station, the communications device using one of said first configuration information and second configuration information to communicate with said target base station; and causing by said apparatus one of said first and second configuration information to be provided to said communications device.

The method may comprise causing by said apparatus of the source base station the other of said first and second configuration to be provided to said communications device.

The other of said first and second configuration may be provided to the communications device in response to determining that a change in a configuration of the communications device is required.

The first configuration information may be shorter than said second configuration information.

The first configuration information may cause the communications device to apply changes to a current configuration of the communications device.

According to another aspect, there is provided a method comprising: causing, by an apparatus of a target base station, first configuration information and second configuration information to be transmitted from the target base station to a source base station, said first and second configuration information being used for a conditional handover of a communications device from the source base station to the target base station; and receiving by said apparatus of the target base station communications from said communications device in accordance with the configuration provided by one of said first configuration information and second configuration information after said conditional handover of said communications device from the source base station to said target base station.

According to an aspect, there is provided an apparatus comprising means for: receiving, from a source base station, first configuration information for a conditional handover of a communications device from the source base station to the target base station; and subsequently receiving, before the conditional handover has occurred, second configuration information for the conditional handover of the communications device from the source base station to the target base station.

The first configuration information may be shorter than said second configuration information.

The first configuration information may comprise information which causes a current configuration to be modified.

The second configuration information may comprise information which causes a new configuration to replace a current configuration.

The second configuration information may comprise information about parameters required by the communication device for said conditional handover.

The first configuration information may be provided in a conditional handover command message.

The second configuration message may be provided in a reconfiguration message.

The means may be for determining that one or more conditions for the conditional handover have been met and in response using the configuration defined by the second configuration information.

The apparatus may be provided in the communications device.

According to another aspect, there is provided an apparatus comprising means for: receiving from a target base station first configuration information and second configuration information for a conditional handover of a communications device from a source base station to the target base station, the communications device using one of said first configuration information and second configuration information to communicate with said target base station; and causing one of said first and second configuration information to be provided to said communications device.

The method may comprise causing by said apparatus of the source base station the other of said first and second configuration to be provided to said communications device.

The other of said first and second configuration may be provided to the communications device in response to determining that a change in a configuration of the communications device is required.

The first configuration information may be shorter than said second configuration information.

The first configuration information may cause the communications device to apply changes to a current configuration of the communications device.

The apparatus may be provided in a source base station.

According to another aspect, there is provided an apparatus comprising means for: causing first configuration information and second configuration information to be transmitted from a target base station to a source base station, said first and second configuration information being used for a conditional handover of a communications device from the source base station to the target base station; and receiving communications from said communications device in accordance with the configuration provided by one of said first configuration information and second configuration information after said conditional handover of said communications device from the source base station to said target base station.

The apparatus may be provided in a target base station.

According to another aspect there is provided an apparatus comprising at least one processor and at least one memory including computer code for one or more programs, the at least one memory and the computer code configured, with the at least one processor, to cause the apparatus at least to: receive, from a source base station, first configuration information for a conditional handover of a communications device from the source base station to the target base station; and subsequently receive, before the conditional handover has occurred, second configuration information for the conditional handover of the communications device from the source base station to the target base station.

The first configuration information may be shorter than said second configuration information.

The first configuration information may comprise information which causes a current configuration to be modified.

The second configuration information may comprise information which causes a new configuration to replace a current configuration.

The second configuration information may comprise information about parameters required by the communication device for said conditional handover.

The first configuration information may be provided in a conditional handover command message.

The second configuration message may be provided in a reconfiguration message.

The at least one memory and the computer code may be configured, with the at least one processor, to cause the apparatus to: determine that one or more conditions for the conditional handover have been met and in response using the configuration defined by the second configuration information.

The apparatus may be provided in the communications device.

According to another aspect there is provided an apparatus comprising at least one processor and at least one memory including computer code for one or more programs, the at least one memory and the computer code configured, with the at least one processor, to cause the apparatus at least to: receive from a target base station first configuration information and second configuration information for a conditional handover of a communications device from a source base station to the target base station, the communications device using one of said first configuration information and second configuration information to communicate with said target base station; and cause one of said first and second configuration information to be provided to said communications device.

The at least one memory and the computer code may be configured, with the at least one processor, to cause the apparatus to cause the other of said first and second configuration to be provided to said communications device.

The other of said first and second configuration may be provided to the communications device in response to determining that a change in a configuration of the communications device is required.

The first configuration information may be shorter than said second configuration information.

The first configuration information may cause the communications device to apply changes to a current configuration of the communications device.

The apparatus may be provided in a source base station.

According to another aspect there is provided an apparatus comprising at least one processor and at least one memory including computer code for one or more programs, the at least one memory and the computer code configured, with the at least one processor, to cause the apparatus at least to: cause first configuration information and second configuration information to be transmitted from a target base station to a source base station, said first and second configuration information being used for a conditional handover of a communications device from the source base station to the target base station; and receive communications from said communications device in accordance with the configuration provided by one of said first configuration information and second configuration information after said conditional handover of said communications device from the source base station to said target base station.

The apparatus may be provided in a target base station.

According to an aspect there is provided an apparatus comprising circuitry configured to: receive, from a source base station, first configuration information for a conditional handover of a communications device from the source base station to the target base station; and subsequently receive, before the conditional handover has occurred, second configuration information for the conditional handover of the communications device from the source base station to the target base station.

The first configuration information may be shorter than said second configuration information.

The first configuration information may comprise information which causes a current configuration to be modified.

The second configuration information may comprise information which causes a new configuration to replace a current configuration.

The second configuration information may comprise information about parameters required by the communication device for said conditional handover.

The first configuration information may be provided in a conditional handover command message.

The second configuration message may be provided in a reconfiguration message.

The at least one memory and the computer code may be configured, with the at least one processor, to cause the apparatus to determine that one or more conditions for the conditional handover have been met and in response using the configuration defined by the second configuration information.

The apparatus may be provided in the communications device.

According to an aspect there is provided an apparatus comprising circuitry configured to: receive from a target base station first configuration information and second configuration information for a conditional handover of a communications device from a source base station to the target base station, the communications device using one of said first configuration information and second configuration information to communicate with said target base station; and cause one of said first and second configuration information to be provided to said communications device.

The circuitry may be configured, with the at least one processor, to cause the apparatus to cause the other of said first and second configuration to be provided to said communications device.

The other of said first and second configuration may be provided to the communications device in response to determining that a change in a configuration of the communications device is required.

The first configuration information may be shorter than said second configuration information.

The first configuration information may cause the communications device to apply changes to a current configuration of the communications device.

The apparatus may be provided in a source base station.

According to an aspect there is provided an apparatus comprising circuitry configured to: cause first configuration information and second configuration information to be transmitted from a target base station to a source base station, said first and second configuration information being used for a conditional handover of a communications device from the source base station to the target base station; and receive communications from said communications device in accordance with the configuration provided by one of said first configuration information and second configuration information after said conditional handover of said communications device from the source base station to said target base station.

The apparatus may be provided in a target base station.

According to an aspect there is provided a computer program comprising computer executable code which when run on at least one processor is configured to cause any of the previously described methods to be performed.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Embodiments will now be described, by way of example only, with reference to the accompanying Figures in which.

DETAILED DESCRIPTION OF THE FIGURES

In the following certain embodiments are explained with reference to communications devices capable of communication via a wireless cellular system and communication systems serving such communications devices. Before explaining in detail the exemplifying embodiments, certain general principles of a wireless communication system, access systems thereof, and communications devices are briefly explained with reference to FIGS. 1 to 3 to assist in understanding the technology underlying the described examples.

Figure 1:
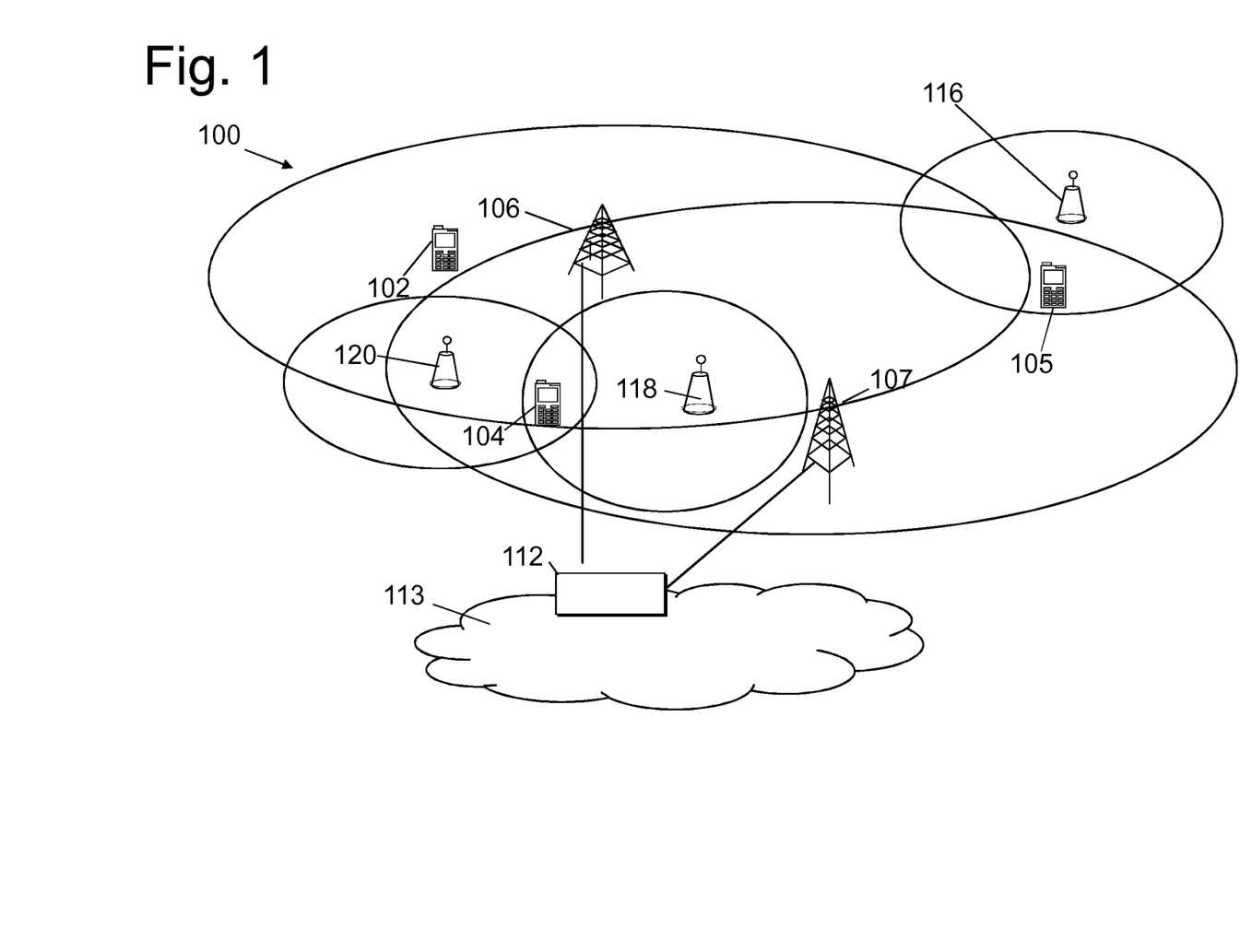
FIG. 1 shows a schematic representation of a communication system.

Reference is made to FIG. 1 which shows an example system 100 in which some embodiments may be provided. The system may be a wireless communications system. In a wireless communication system 100, such as that shown in FIG. 1, communication devices or user equipment (UE) 102, 104, 105 are provided. This communications devices will be referred to as UEs but it should be appreciated that the device may be any suitable communications device and the term UE is intended to cover any such device. Some examples of communications devices are discussed below and as used in this document the term UE is intended to cover any one or more of those devices and/or any other suitable device.

The UEs may be provided wireless access via at least one base station (or similar wireless transmitting and/or receiving node or point.

In FIG. 1, there are base stations 106 and 107 which serve relatively large cells. Smaller base stations 116, 118 and 120 may also be provided. The smaller base stations 116, 118 and 120 may be pico or femto level base stations or the like. In some embodiments, the smaller base stations may not be provided.

One or more of the base stations may communicate with a network 113 via one or more network functions 112. One or more of the base stations may communicate with the network via one or more other base stations. For example one or more smaller base stations may communicate with a network via one or more of the large base stations.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). One 3GPP based development is often referred to as the long term evolution (LTE) of the Universal Mobile Telecommunications System (UMTS) radio-access technology. Some developments of LTE are referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs). Another example of a suitable communications system is the 5G or New Radio (NR) concept. Base stations of NR systems may be known as next generation Node Bs (gNBs). The base station may be an ng-eNB. Other examples of radio access system comprise those provided by base stations of systems that are based on technologies such as wireless local area network (WLAN) and/or WiMAX (Worldwide Interoperability for Microwave Access). A base station can provide coverage for an entire cell or similar radio service area. Some examples of access points or base stations have been mentioned and as used in this document the term base station is intended to cover any one or more of those devices and/or any other suitable device.

Figure 2:
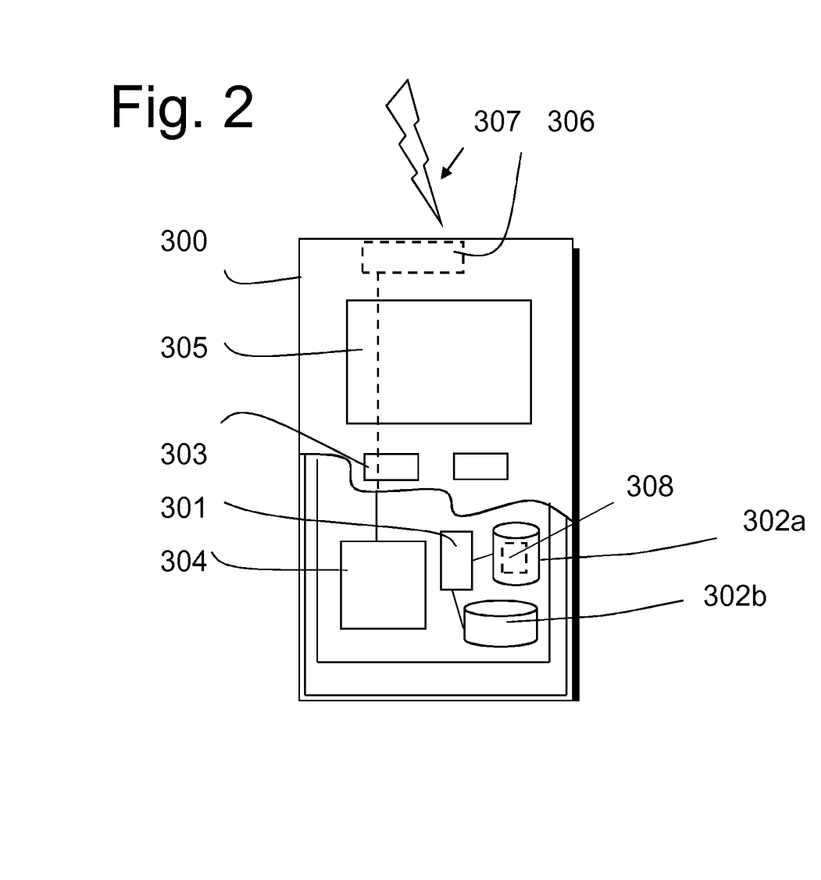
FIG. 2 shows a schematic representation of a communications device.

FIG. 2 illustrates an example of a communications device 300, such as the wireless communications device 102, 104 or 105 shown on FIG. 1. The wireless communications device 300 may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, machine-type communications (MTC) devices, IoT type communications devices or any combinations of these or the like. The communications device may be incorporated within another device.

The device 300 may receive signals over an air or radio interface 307 via appropriate apparatus for receiving and may transmit signals via appropriate apparatus for transmitting radio signals. In FIG. 2 transceiver apparatus is designated schematically by block 306. The transceiver apparatus 306 may be provided for example by means of a radio part and associated antenna arrangement. The antenna arrangement may be arranged internally or externally to the mobile device. In some embodiments, a plurality of transceivers may be provided by the transceiver apparatus.

The wireless communications device 300 may be provided with at least one processor 301 and at least one memory. The at least one memory may comprise at least one ROM 302a and/or at least one RAM 302b. The communications device may comprise other possible components 303 for use in software and hardware aided execution of tasks it is designed to perform, including control of access to and communications with access systems and other communications devices. The at least one processor 301 is coupled to the at least one memory. The at least one processor 301 may be configured to execute an appropriate software code 308 to implement one or more of the following aspects. The software code 308 may be stored in the at least one memory, for example in the at least one ROM 302b.

The processor, storage and other relevant control apparatus can be provided on an appropriate circuit board and/or in chipsets. This feature is denoted by reference 304.

The device may optionally have a user interface such as key pad 305, touch sensitive screen or pad, combinations thereof or the like.

Optionally one or more of a display, a speaker and a microphone may be provided depending on the type of the device.

Figure 3:
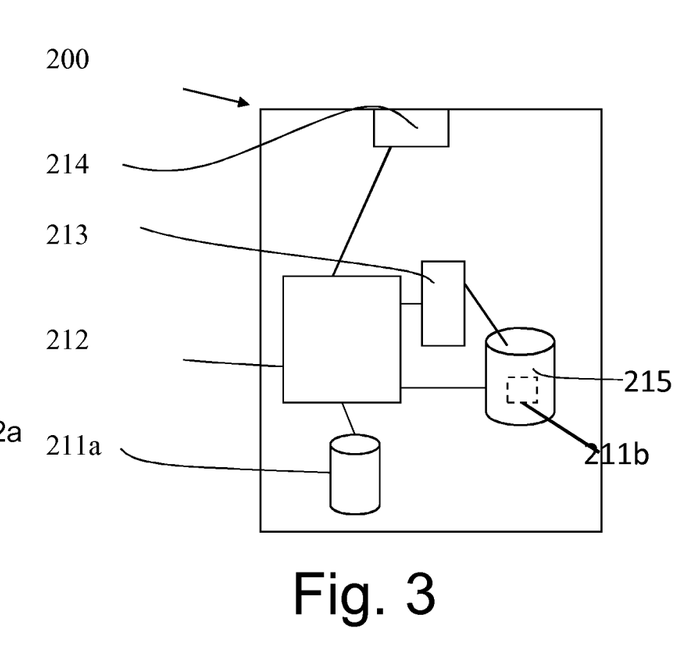
FIG. 3 shows an apparatus of a base station.

An example apparatus 200 is shown in FIG. 3. The apparatus shown in FIG. 3 may be provided in a base station. The apparatus comprises at least one memory. The at least one memory may be at least one random access memory (RAM) 211a and/or at least one read only memory (ROM) 211b, at least one processor 212, 213 and an input/output interface 214. The at least one processor 212, 213 is coupled to the RAM 211a and the ROM 211b. The at least one processor 212, 213 may be configured to execute an appropriate software code 215 to implement one or more of the following aspects. The software code 215 may be stored in the ROM 211b.

Communication protocols and/or parameters which shall be used for the connection are also typically defined. The communications devices may access the communication system based on various access techniques.

Figure 4:
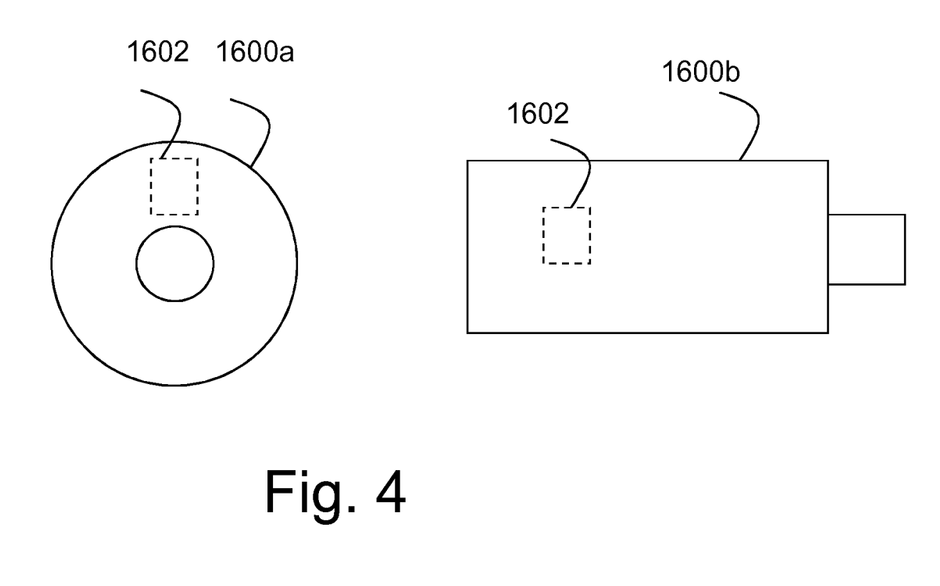
FIG. 4 shows a schematic representation of non-volatile memory media.
Figure 5:
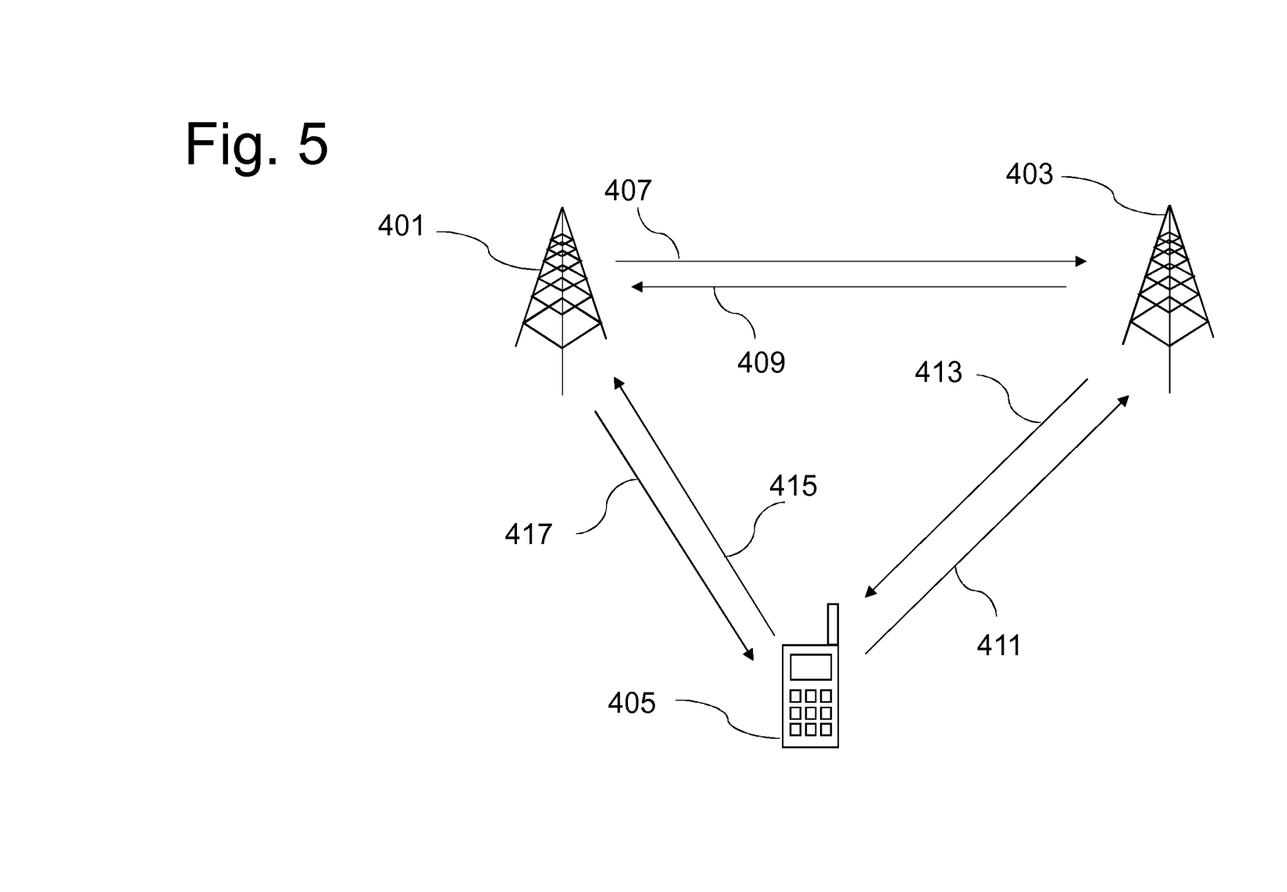
FIG. 5 schematically shows an example of a three entity network within which embodiments may be employed.

Reference will now be made to FIG. 4, which shows a user equipment (UE) 405, first base station (serving or source node) 401 which provides a first cell (serving cell), and a second base station (target node) 403 which provides a second cell (target cell). The serving node 401 is able to send messages 417 to the UE 405 and messages 407 to the target node 403. The UE 405 is able to send messages 415 to the serving node 401 and messages 411 to the target node 403. The target NB 403 is able to send messages 409 to the serving node 401 and messages 413 to the UE 405.

In a basic handover (BHO), the process may be triggered by a UE observing conditions that trigger a measurement report based on network configuration. The UE sends a measurement report. The report points to a particular cell (target cell), and may indicate that the neighbouring cell has a better signal quality than the serving cell (the cell currently providing network coverage to the UE). The serving node controlling the source cell sends a message to the target node controlling the target cell for handover preparation. This message has the UE context. The context includes, for example, data radio bearers (DRBs) that are used by the UE, and the corresponding sublayer configuration, for example, packet data convergence protocol (PDCP). The target node replies with an acknowledgment which contains the radio resource control (RRC) configuration that the UE will need to use when it accesses the target cell. This RRC configuration may include the new configuration of DRBs (based on the UE context) and may include the radio configuration that should be used in target cell. The serving cell sends the handover command to the UE. The UE then establishes a connection to the target cell, and applies the RRC configuration received in the handover command message. The target node may then indicate to the serving node that the handover was successful, and the serving node may release the resources allocated to the UE.

Conditional handover CHO differ from the above described handover in that the UE does not immediately perform a random access procedure with respect to the target cell after receiving the handover command, but waits for one or more conditions to be fulfilled. This condition may be for example that the quality of the target cell is above a given threshold.

In response to a conditional handover request, the target base station will provide a CHO acknowledgement. This message includes the RRC parameters (RRC Configuration) that UE will use at the target cell. The RRC configuration comprises an additional condition for the UE, as discussed below.

The serving base station sends to the UE via the serving Cell, the RRC Reconfiguration message, including the RRC target configuration delivered by the target cell. The UE then waits for the one or more conditions for HO to be fulfilled. For example, a condition may be that the target cell quality is above a threshold (different from the threshold leading to the CHO request). When the one or more conditions for HO are fulfilled at the UE, the UE connects to the target cell, and sends an RRC Reconfiguration complete message to the target cell. The target base station will send a message to the source base station an indication that the handover was successful. As described above, in case of CHO, the UE does not immediately perform RACH to the target cell after receiving the handover command, but waits for some condition(s) to be fulfilled. This condition could be for example that the quality of the target cell is above a given threshold. The period between the UE configuration for CHO and the actual Handover can vary in time depending on the radio conditions, the UE behaviour (trajectory or movement) and the condition (the value of the threshold for example).

An advantage of CHO is that the UE can quickly perform the HO when the radio conditions are met, as some of the preparation messages between the source cell and the target cell have already been exchanged. In BHO, there are messages exchanged between UE and source cell and between source cell and target cell that may slow down the process when the handover parameters are met.

Some embodiments may provide conditional handover (CHO) in a next evolution of radio network systems, for example so called 5G or new radio (NR).

When a conditional handover is prepared, an apparatus of the target base station provides two configurations for the UE. The apparatus of the target cell causes information about the two configurations to be transmitted to the source cell or base station.

The two configurations will be referred to as a delta configuration and a full configuration.

The delta configuration is a configuration based on the known or current UE configuration. The delta configuration may comprise for example only the parameters that need to be changed. For example, the delta configuration may omit any reference to the configuration of the PDCP layer. The UE in this scenario will continue to use its current configuration of PDCP for the handover. The delta configuration may indicates one or more parameters not used by the UE at the time of the CHO request, for example a new DRB can be configured in addition to the existing DRB in UE configuration. An advantage of the delta configuration, in some embodiments, is that its size is relatively small because it can reuse the existing UE configuration.

The full configuration may be a full list of all the UE parameters required for transmission and reception that will apply for the HO. All or nearly all or most of the radio parameters needed for the UE to interact with the network may be re-defined, regardless of current UE configuration. For example, the full configuration may need to provide all the needed parameters for PDCP, even if the UE has already parameters defined for PDCP in its current configuration.

A drawback of full configuration, in some embodiments, is that its size is relatively large because it needs to include all the needed parameters.

An apparatus of the source base station providing the source cell cause the delta configuration to be transmitted to the UE. It should be appreciated that the information required to be transmitted to the UE for a delta configuration is less that than that required for a full configuration. The delta configuration may be transmitted in a smaller size of message from the source base station to the UE.

It should be noted that after being configured for CHO by the source base station, the UE continues to communicate (transmission and reception) with the source base station. For example, the gNB controlling the source cell is still controlling the UE and can make reconfigurations.

If UE is reconfigured by the source base station after CHO configuration, the apparatus of the source base may be configured to alternatively or additionally send to the UE the full configuration if the delta configuration would create inconsistencies. If the UE receives full configuration information, the UE will apply the full reconfiguration when it eventually executes the CHO to the target cell. When the UE access the target cell, the apparatus of the UE will cause a message to be transmitted to the target base station to indicate that the UE has applied the full reconfiguration.

Figure 6:
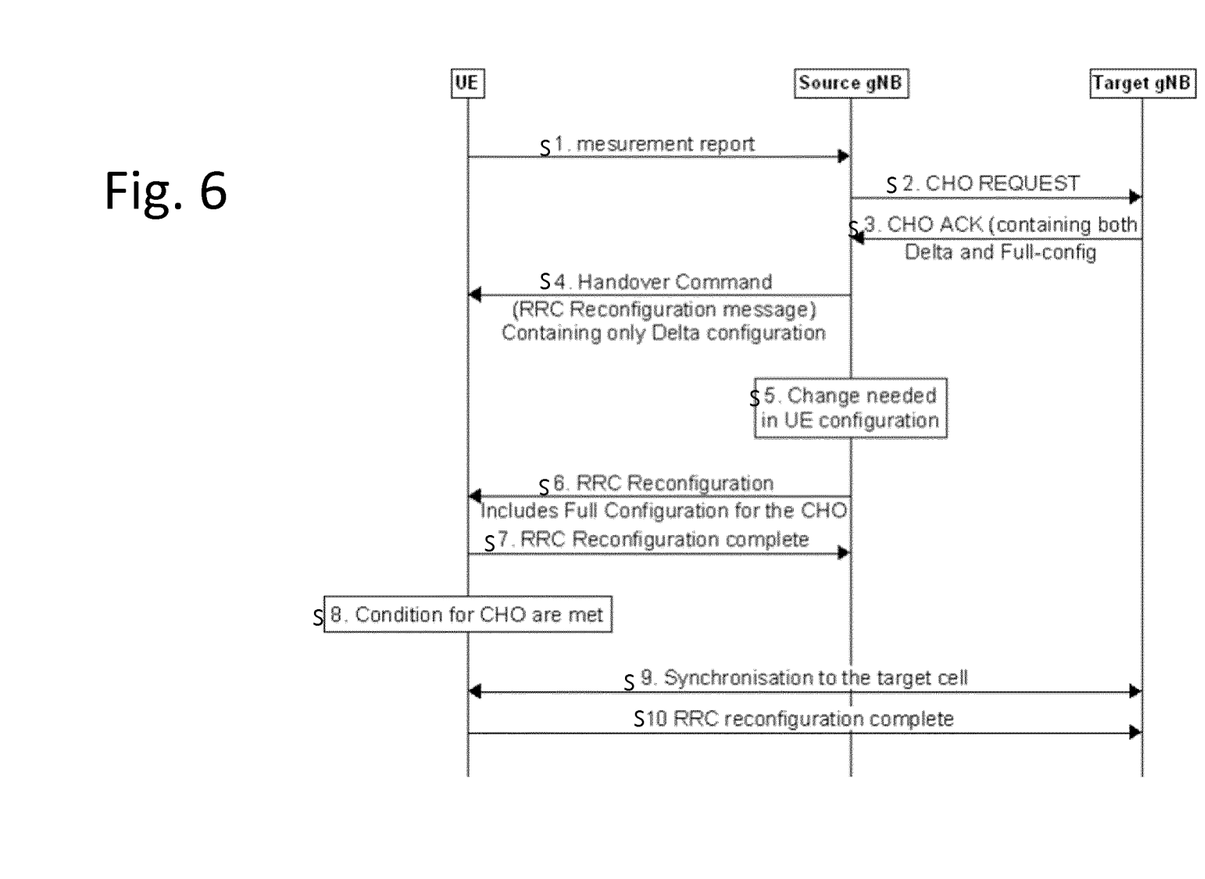
FIG. 6 shows a signal flow of some embodiments.

Reference is made to FIG. 6.

In step S1, an apparatus of the UE is configured to cause a message to be transmitted to the source base station. The message comprises information about a potential target cell. The message may comprise a measurement report to be transmitted to the source base station. The measurement report may indicate that a neighbouring cell of a target base station is visible.

In step S2, an apparatus of the source base station is configured to cause a conditional handover request to be transmitted to the target base station controlling the target cell. This message may comprise the UE context.

In step S3, an apparatus of the target base station is configured to cause a message to be transmitted to the source base station. The message may be an acknowledgement ACK of the conditional handover request. The message may comprise one or more parameters which the UE will use when communicating with the target cell. The message may comprise delta configuration information and full configuration information.

In step S4, the apparatus of the source base station is configured to cause a handover command to be transmitted to the UE. The handover command may comprise a reconfiguration message. The message may comprise the RRC target configuration received from the target base station. The message may comprise the delta configuration information but not the full configuration information. The message may be a radio resource control RRC message.

It should be appreciated that there may be situations where the apparatus of the source base station may send the full configuration in this step. However, it may in some embodiments be more usual to send the delta configuration in this step.

In step S5, an apparatus of the source base station is configured to determine that a change in the configuration of the UE is required. This may be changes to any radio parameters. This may be for changes for lower layers, for example a new DRX (discontinuous reception) configuration. The changes may alternatively or additionally be changes to one or more of PDCP parameter(s), RLC (radio link control) parameter(s) and MAC (media access control) parameter(s)

In step S6, the apparatus of the source base station is configured to cause a message to be transmitted to the UE. The message may be a reconfiguration message. The message may comprise the full configuration information which should be used. The message may be a RRC reconfiguration message.

In step S7, the apparatus of the user equipment is configured to cause a message to be transmitted to the source base station indicating that the reconfiguration has been completed. The message may be RRC reconfiguration complete message.

In step S8, the apparatus of the user equipment is configured to determine that the one or more conditions for a conditional handover have been met. Such a condition may be for example that the target cell quality is above a threshold, which may be different from the threshold which triggered the CHO request. Alternatively or additionally the condition may be that the serving cell signal quality (source cell) has fallen below a threshold. Any such thresholds may be pre-determined values or the thresholds may be determined dynamically.

In step S9, the apparatus of the UE and the apparatus of the target base station are configured to cause there to be a synchronisation of the UE to the target cell. This may require the sending of one or more messages. This synchronisation to the target cell may use a random access procedure. The UE will use the full configuration.

In step S10, the apparatus of the UE is configured to cause a message to be sent to the target base station confirming that the reconfiguration has been completed. This may be a RRC reconfiguration complete message.

Figure 7:
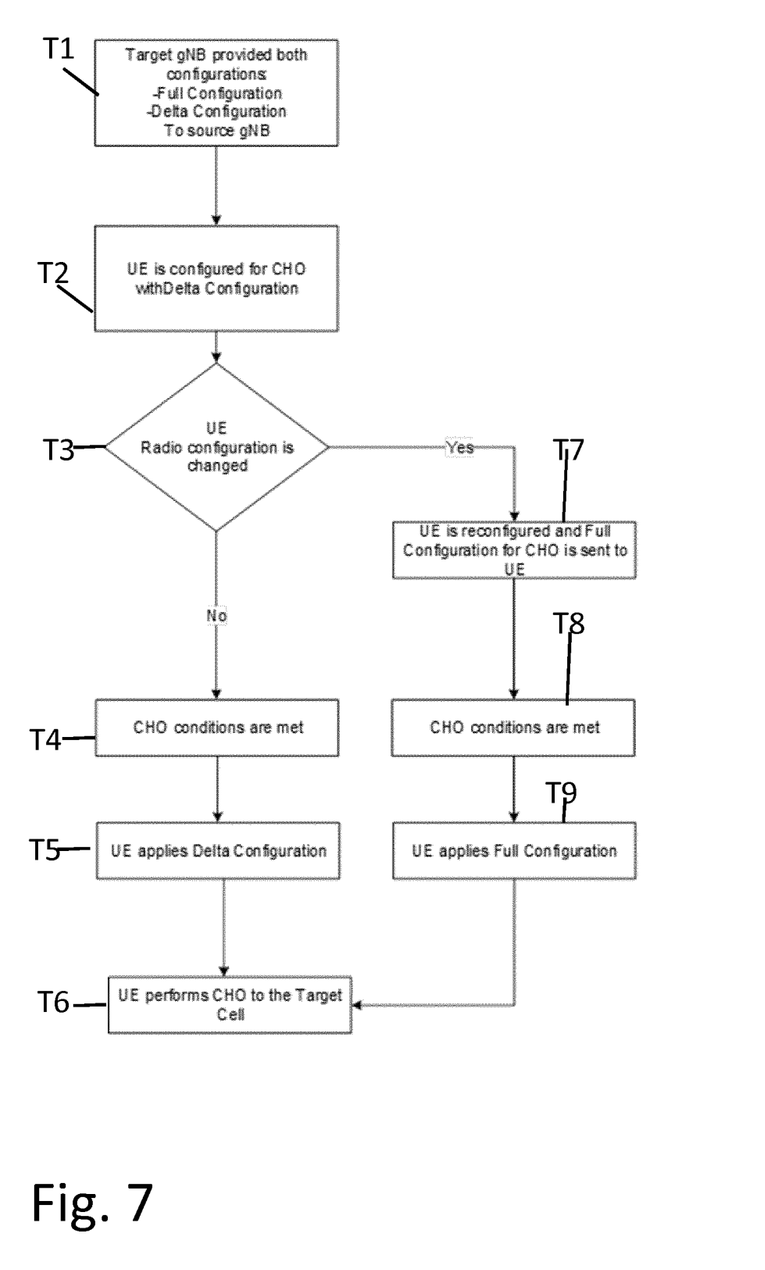
FIG. 7 shows a method of some embodiments.

Reference is made to FIG. 7 which shows a method illustrating the UE behaviour in more detail.

In step T1, the target base station provides both the full configuration and the delta configuration to the source base station.

In step T2, the UE is configured for a conditional handover to happen in the future using the delta configuration. The UE receives the delta configuration from the source base station.

In step T3, this changed radio configuration may be any one or more of the radio parameters discussed previously.

If the UE radio configuration is changed, then the next step is step T7 and if not, the next step is step T4.

In step T4, it is determined that the CHO conditions are met. This may be determined by an apparatus of the UE. Alternatively or additionally, this may be determined by an apparatus of the source base station based on information or measurements received from the UE, When it is determined in step T4, that the CHO conditions are met, the apparatus of the UD will apply the delta configuration in step T5.

In step T6, the UE will then perform CHO to the target cell.

Going back to step T3, if it is determined that the radio configuration is changed, then the next step is step T7. In step T7, the UE is reconfigured and the full configuration for CHO is received at the UE from the source base station.

In step T8, it is determined that the CHO conditions are met.

When it is determined in step T8, that the CHO conditions are met, the apparatus of the UD will apply the full configuration in step T9. Step T9 is then followed by step T6, in which the UE will then perform CHO to the target cell.

An advantage of the CHO is that the UE can quickly perform the HO when at least one radio condition(s) is met, as some of the preparation messages between the source cell and the target cell have already been exchanged.

Figure 8:
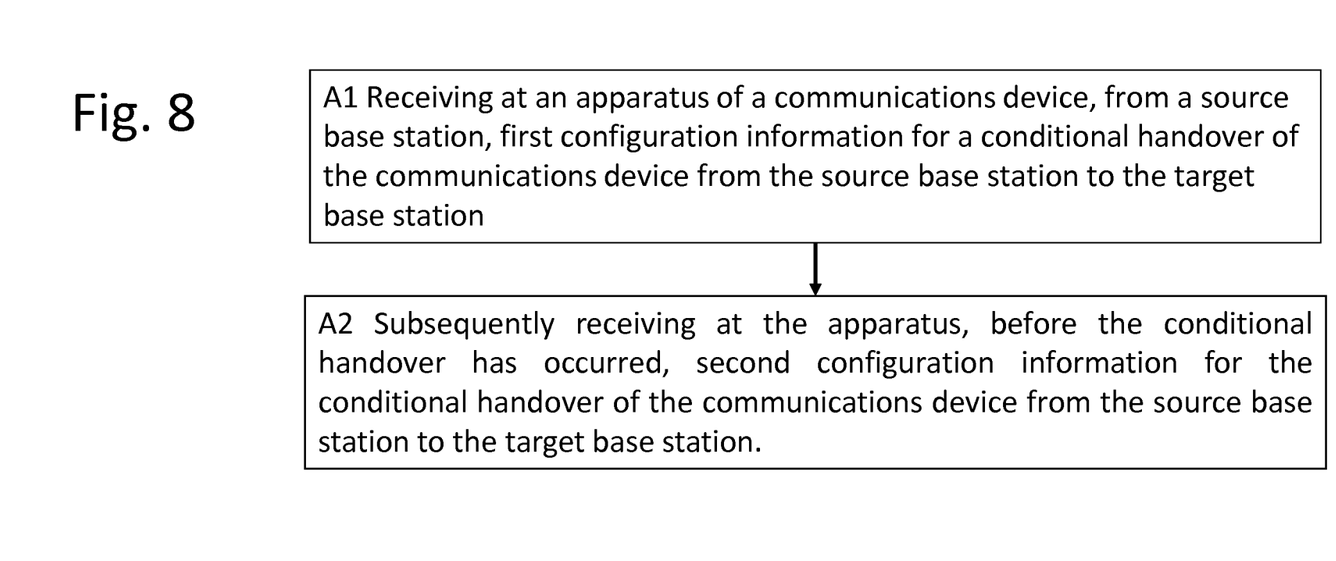
FIG. 8 shows a method of some embodiments performed in an apparatus of a communications device.

Reference is made to FIG. 8 which shows a method of some embodiments. The method may be performed in an apparatus. The apparatus may be in a communications device. The apparatus may be provided by for example at least one processor and at least one memory. In step A1, the method comprises receiving at an apparatus of a communications device, from a source base station, first configuration information for a conditional handover of the communications device from the source base station to the target base station.

In step A2, the method comprises subsequently receiving at the apparatus, before the conditional handover has occurred, second configuration information for the conditional handover of the communications device from the source base station to the target base station.

Figure 9:
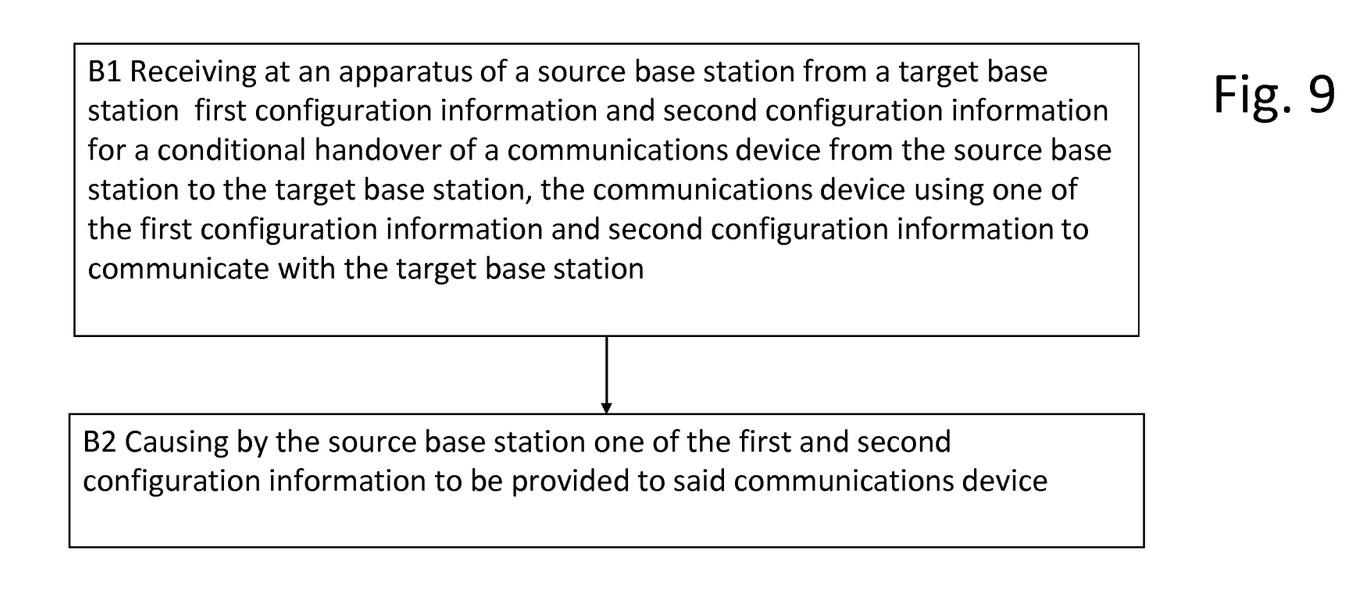
FIG. 9 shows a method of some embodiments performed in an apparatus of a source base station.

Reference is made to FIG. 9 which shows a method of some embodiments. The method may be performed in an apparatus. The apparatus may be in a source base station. The apparatus may be provided by for example at least one processor and at least one memory.

In step B1, the method comprises receiving at an apparatus of a source base station from a target base station first configuration information and second configuration information for a conditional handover of a communications device from the source base station to the target base station, the communications device using one of said first configuration information and second configuration information to communicate with said target base station.

In step B2, the method comprises causing by the apparatus of the source base station one of said first and second configuration information to be provided to the communications device.

Figure 10:
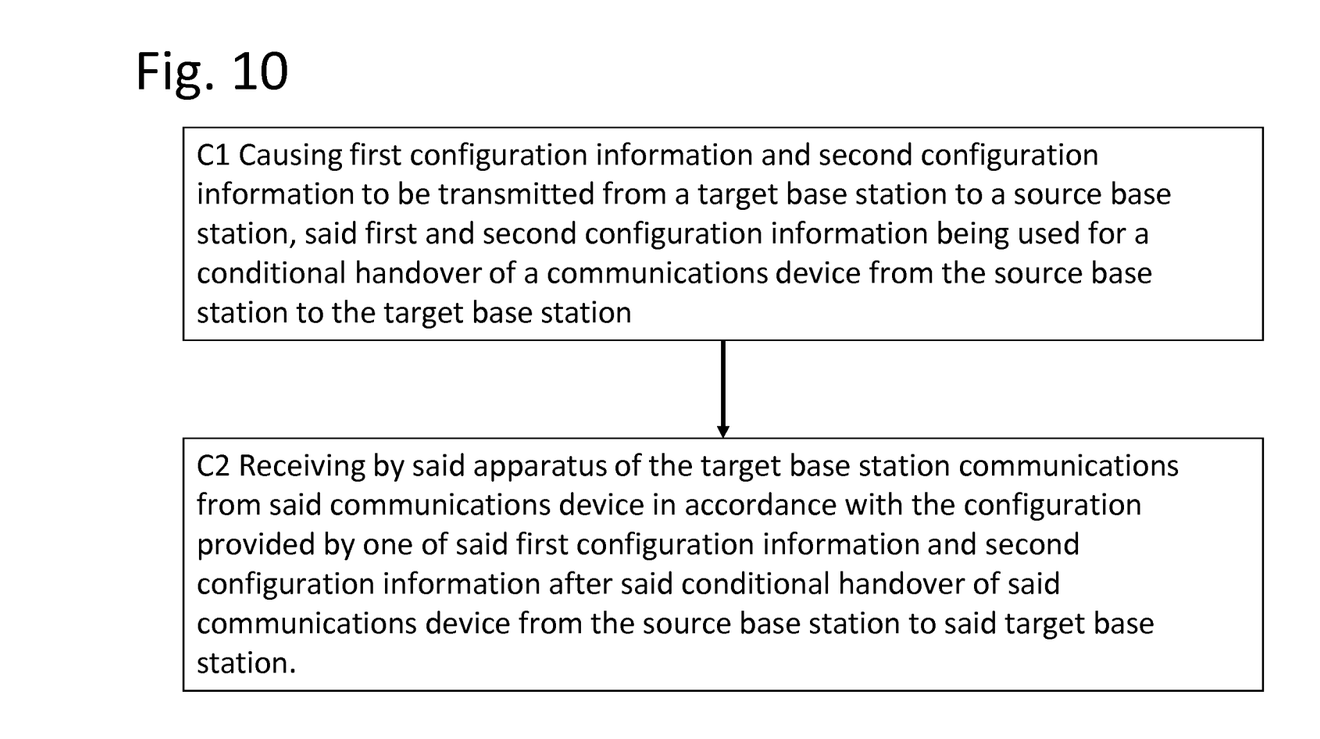
FIG. 10 shows a method of some embodiments performed in an apparatus of a target base station.

Reference is made to FIG. 10 which shows a method of some embodiments. The method may be performed in an apparatus. The apparatus may be in a target base station. The apparatus may be provided by for example at least one processor and at least one memory.

In step C1, the method comprises causing, by an apparatus of a target base station, first configuration information and second configuration information to be transmitted from the target base station to a source base station, the first and second configuration information being used for a conditional handover of a communications device from the source base station to the target base station.

In step C2, the method comprises receiving by the apparatus of the target base station communications from the communications device in accordance with the configuration provided by one of said first configuration information and second configuration information after said conditional handover of said communications device from the source base station to said target base station.

Some embodiments have been described in the context of a 5G system. However, this is by way of example only and other embodiments may be used with any other suitable wireless communication systems.

FIG. 4 shows a schematic representation of non-volatile memory media 1600*a* (e.g. computer disc (CD) or digital versatile disc (DVD)) and 1600*b* (e.g. universal serial bus (USB) memory stick) storing instructions and/or parameters 1602 which when executed by a processor allow the processor to perform one or more of the steps of any of the methods of any of the embodiments.

It is noted that while the above describes example embodiments, there are several variations and modifications which may be made to the disclosed solution without departing from the scope of the present invention. These aspects may be transposed to other radio access technology systems other than those described purely by way of example.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., in FIGS. 6 to 10 may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:
(i) a combination of analogue and/or digital hardware circuit(s) with software/firmware and
(ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example an integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. A method comprising:
receiving at an apparatus of a source base station from a target base station one message including both delta configuration information and full configuration information a for one and a same conditional handover from user equipment of the source base station to the target base station, wherein the delta configuration information is a configuration based on a current user equipment configuration that indicates one or more parameters not used by the user equipment at a time of the conditional handover request and comprises only parameters that need to be changed in case a conditional handover condition is fulfilled,
wherein the full configuration information comprises a full list of user equipment parameters required for transmission and reception that will apply for the conditional handover;
causing by said apparatus of the source base station said delta configuration information for said conditional handover to be provided to said user equipment;
in response to provision of said delta configuration information, determine by said apparatus of the source base station, that a change in the configuration of the user equipment is required, and
causing by said apparatus of the source base station using a conditional handover acknowledgement message the full configuration information for said conditional handover to be provided to said user equipment, wherein said full configuration information is provided to the user equipment in response to determining that the change in the configuration of the user equipment is required;

wherein the conditional handover acknowledgement message comprises a radio resource control configuration for use by the user equipment to access a target cell.

2. The method as claimed in claim 1, comprising causing by said apparatus of the source base station the other of said delta configuration information and second configuration information to be provided to said user equipment.

3. The method as claimed in claim 1, wherein said the other of said delta configuration information and second configuration information is provided to the user equipment in response to determining that the change in a configuration of the user equipment is required.

4. The method as claimed in claim 3, wherein said change in the configuration comprises a change of a discontinuous reception configuration.

5. The method as claimed in claim 3, wherein said change in the configuration comprises a change of at least one of a discontinuous reception configuration, one or more packet data control protocol parameters, a radio link control parameter, or a media access control parameter.

6. The method as claimed in claim 1, wherein said delta configuration information is shorter than said full configuration information.

7. The method as claimed in claim 1, wherein said delta configuration information cause the user equipment to apply changes to a current configuration of the user equipment.

8. An apparatus, comprising: at least one processor; and at least one memory storing instructions, that when executed by the at least one processor, cause the apparatus at least to:

receive at the apparatus of a source base station from a target base station one message including both delta configuration information and full configuration information for a request for one and a same conditional handover from user equipment the source base station to the target base station, wherein the delta configuration information is a configuration based on a current user equipment configuration that indicates one or more parameters not used by the user equipment at a time of the conditional handover request and comprises only parameters that need to be changed in case a conditional handover condition is fulfilled, wherein the full configuration information comprises a full list of user equipment parameters required for transmission and reception that will apply for the conditional handover, causing by said apparatus of the source base station said delta configuration information for said conditional handover to be provided to said user equipment;

in response to provision of said delta configuration information, determine by said apparatus of the source base station, that a change in the configuration of the user equipment is required, and cause by said apparatus of the source base station using a conditional handover acknowledgement message the full configuration information for said conditional handover to be provided to said user equipment, wherein said full configuration information is provided to the user equipment in response to determining that the change in the configuration of the user equipment is required, wherein the conditional handover acknowledgement message comprises a radio resource control configuration for use by the user equipment to access a target cell.

* * * * *